US012686184B2

(12) United States Patent
Tatsushima

(10) Patent No.:   US 12,686,184 B2
(45) Date of Patent:       Jul. 21, 2026

(54) FILAMENT WINDING DEVICE AND FILAMENT WINDING METHOD

(71) Applicant: HONDA MOTOR CO., LTD., Tokyo (JP)

(72) Inventor: Kosuke Tatsushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 222 days.

(21) Appl. No.: 18/391,990

(22) Filed: Dec. 21, 2023

(65) Prior Publication Data

US 2024/0208158 A1      Jun. 27, 2024

(30) Foreign Application Priority Data

Dec. 27, 2022    (JP) ................................. 2022-209144

(51) Int. Cl.
B29C 70/24          (2006.01)
B29C 70/38          (2006.01)
(52) U.S. Cl.
CPC ............ B29C 70/24 (2013.01); B29C 70/384 (2013.01)

(58) Field of Classification Search
CPC ... B29C 70/24; B29C 70/384; B29C 53/8016; B29C 70/32; B29C 70/386; B29C 70/388; B29C 70/54
See application file for complete search history.

(56) References Cited

U.S. PATENT DOCUMENTS

| | | | |
|---|---|---|---|
| 11,285,677 B2 * | 3/2022 | Tingle ................... | B29C 70/388 |
| 2016/0264375 A1 * | 9/2016 | Hatta ..................... | B65H 57/16 |
| 2019/0168989 A1 * | 6/2019 | Kobayashi ............. | B65H 54/44 |
| 2020/0001519 A1 * | 1/2020 | Tanigawa ............... | B65H 67/02 |
| 2020/0224823 A1 * | 7/2020 | Hatta ..................... | B29C 63/08 |

FOREIGN PATENT DOCUMENTS

JP          2007-276193 A      10/2007

* cited by examiner

*Primary Examiner* — George R Koch
*Assistant Examiner* — Christopher C Caillouet
(74) *Attorney, Agent, or Firm* — Carrier, Shende & Associates P.C.; Fulchand P. Shende; Joseph P. Carrier

(57)          ABSTRACT

In a filament winding device and a filament winding method, when a band-shaped bundle is wound around a workpiece by way of hoop winding, a straight roller is selected, and the selected straight roller comes into contact with the band-shaped bundle. When the band-shaped bundle is wound around the workpiece by way of helical winding, a crown roller is selected, and the selected crown roller comes into contact with the band-shaped bundle.

5 Claims, 5 Drawing Sheets

FIG. 5

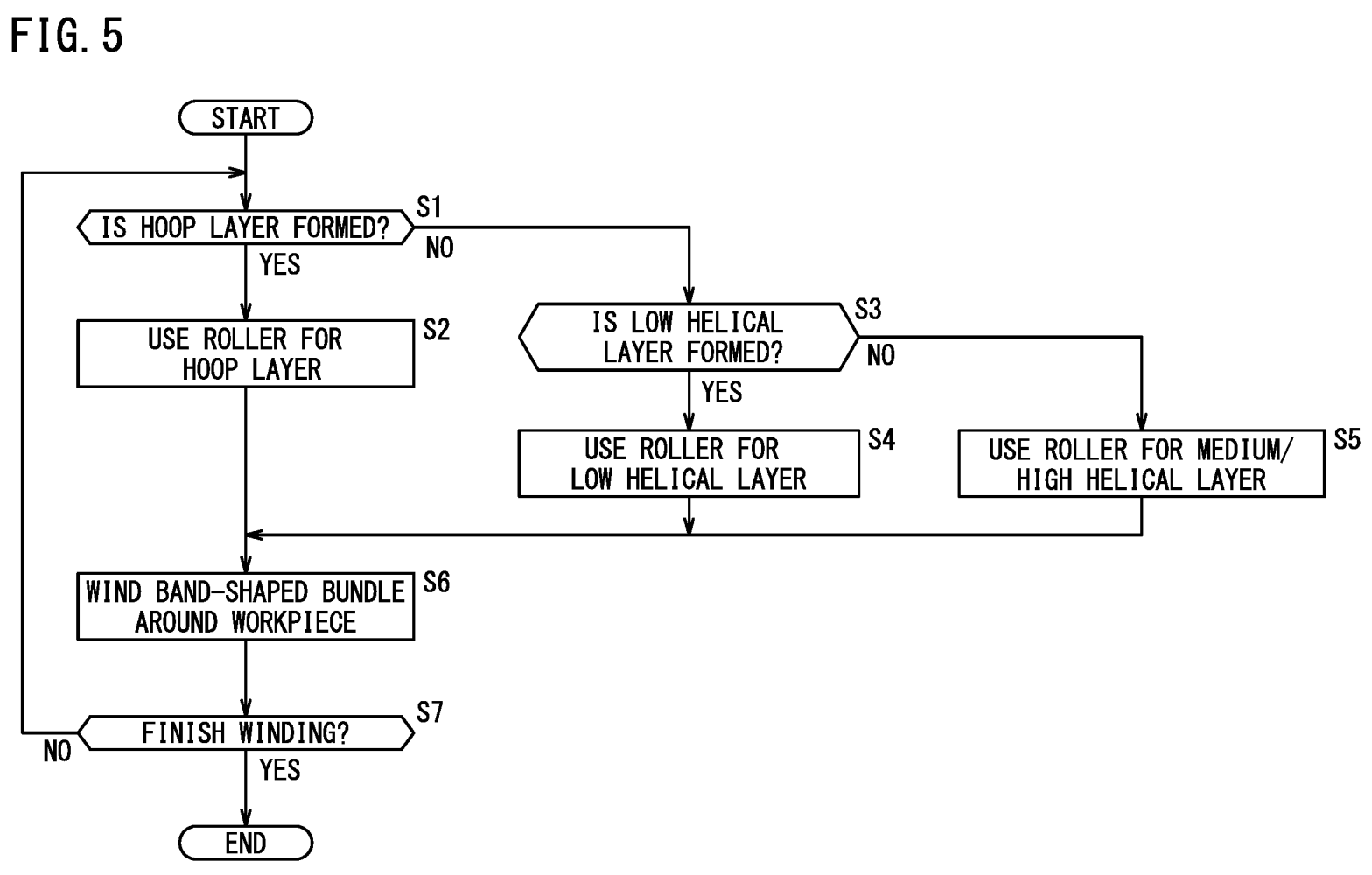

START

S1 — IS HOOP LAYER FORMED?
NO
YES

S2 — USE ROLLER FOR HOOP LAYER

S3 — IS LOW HELICAL LAYER FORMED?
NO
YES

S4 — USE ROLLER FOR LOW HELICAL LAYER

S5 — USE ROLLER FOR MEDIUM/HIGH HELICAL LAYER

S6 — WIND BAND-SHAPED BUNDLE AROUND WORKPIECE

S7 — FINISH WINDING?
YES
NO

END

FILAMENT WINDING DEVICE AND FILAMENT WINDING METHOD

CROSS-REFERENCE TO RELATED APPLICATIONS

This application is based upon and claims the benefit of priority from Japanese Patent Application No. 2022-209144 filed on Dec. 27, 2022, the contents of which are incorporated herein by reference.

BACKGROUND OF THE INVENTION

Field of the Invention

The present invention relates to a filament winding device and a filament winding method.

Description of the Related Art

JP 2007-276193 A discloses a filament winding device (FW device) for winding a fiber bundle, which is a bundle of a plurality of fibers, around a workpiece. In the FW device, a plurality of fiber bundles are aligned in a row in the widthwise direction of the fiber bundles to form one band-shaped fiber bundle (band-shaped bundle). The band-shaped bundle is wound around the workpiece.

SUMMARY OF THE INVENTION

When a band-shaped bundle is wound around a workpiece by way of helical winding, a difference in path length occurs between the center and both ends of the band-shaped bundle in the widthwise direction. Specifically, the path length at the center of the band-shaped bundle becomes longer, and the path length at both ends of the band-shaped bundle becomes shorter. Thus, the tension applied to the fiber bundles disposed at both ends of the band-shaped bundle is smaller than the tension applied to the fiber bundle disposed at the center of the band-shaped bundle. As a result, the mechanical strength of the product, which is a workpiece wound with the band-shaped bundle, may be reduced.

An object of the present invention is to solve the aforementioned problem.

A filament winding device according to a first aspect of the present invention is configured to supply a band-shaped bundle, which is a bundle of a plurality of fibers, to a workpiece, and wind the band-shaped bundle around the workpiece, and the workpiece includes a cylinder portion having a round tubular shape and dome portions provided at both ends of the cylinder portion. The filament winding device includes a plurality of rollers configured to rotate while being in contact with the band-shaped bundle to thereby feed the band-shaped bundle toward the workpiece, and a roller change mechanism configured to select one of the plurality of rollers and bring a selected roller into contact with the band-shaped bundle, wherein the plurality of rollers include a straight roller and a crown roller, and the roller change mechanism is configured to, when the band-shaped bundle is wound around the workpiece by way of hoop winding, select the straight roller and bring the selected straight roller into contact with the band-shaped bundle, and when the band-shaped bundle is wound around the workpiece by way of helical winding, select the crown roller and bring the selected crown roller into contact with the band-shaped bundle.

A filament winding method according to a second aspect of the present invention supplies a band-shaped bundle, which is a bundle of a plurality of fibers, to a workpiece, and winds the band-shaped bundle around the workpiece. The workpiece includes a cylinder portion having a round tubular shape and dome portions provided at both ends of the cylinder portion. The filament winding method includes selecting a straight roller and bringing the selected straight roller into contact with the band-shaped bundle when the band-shaped bundle is wound around the workpiece by way of hoop winding, and selecting a crown roller and bringing the selected crown roller into contact with the band-shaped bundle when the band-shaped bundle is wound around the workpiece by way of helical winding, as a first step, and rotating the straight roller or the crown roller in contact with the band-shaped bundle to feed the band-shaped bundle toward the workpiece and winding the band-shaped bundle around the workpiece, as a second step.

According to the present invention, the straight roller is selected for hoop winding, and the crown roller is selected for helical winding. This makes it possible to absorb the difference in path length between the center and both ends of the band-shaped bundle in the widthwise direction when the band-shaped bundle is wound around the workpiece, and to appropriately apply tension to each fiber bundle of the band-shaped bundle. As a result, the mechanical strength of the product, which is a workpiece wound with the band-shaped bundle, can be improved.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a flowchart showing the operation of the FW device.

DETAILED DESCRIPTION OF THE INVENTION

Figure 1:
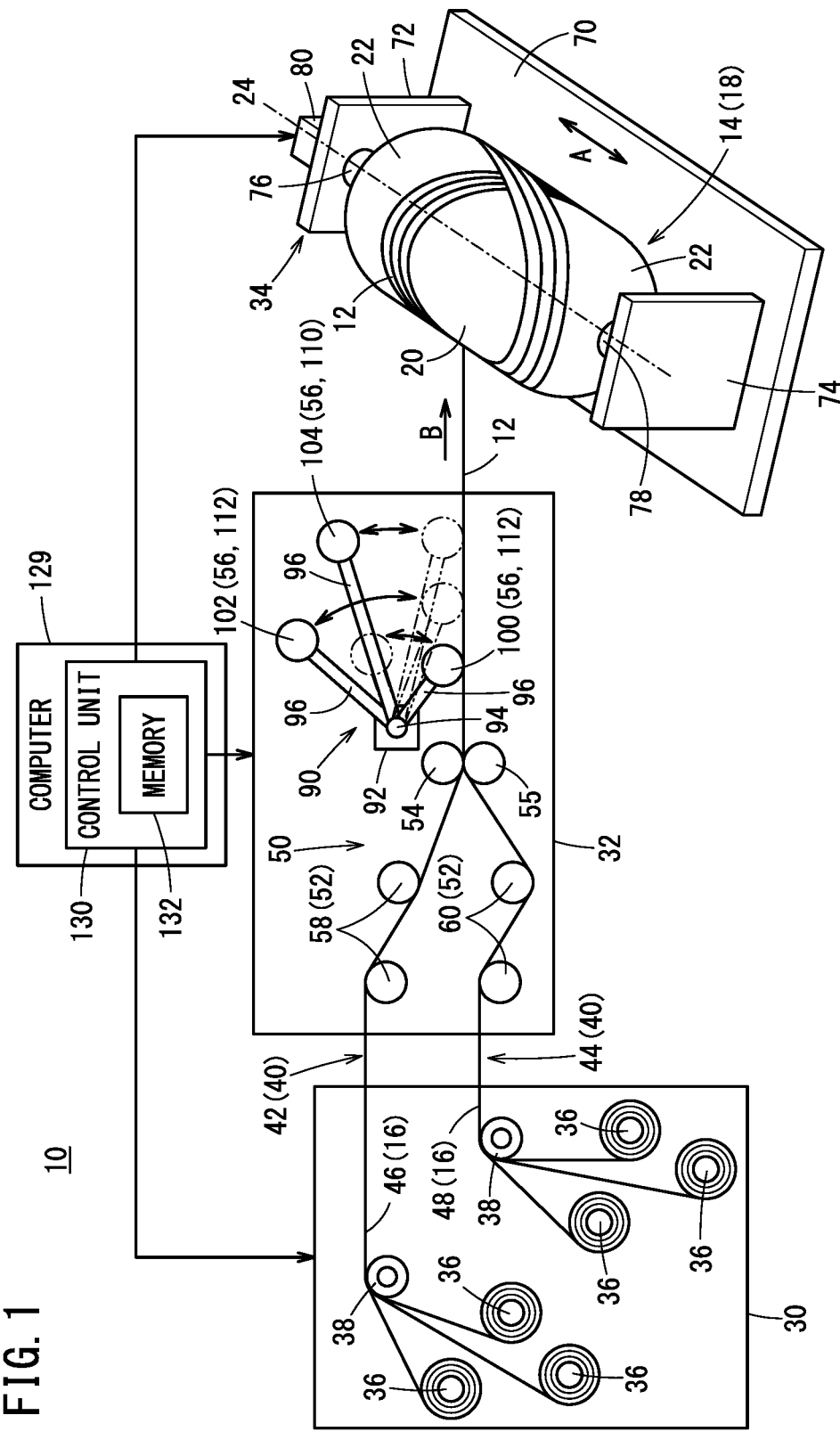
FIG. 1 is a diagram showing the configuration of an FW device.

FIG. 1 is a diagram showing a configuration of a filament winding device 10 according to the present embodiment. In the following description, the filament winding device 10 may be sometimes referred to as an FW device 10.

The FW device 10 produces a product such as a high pressure tank (not shown) by winding a band-shaped bundle 12, which is a bundle of a plurality of fibers (not shown), around a workpiece 14. The band-shaped bundle 12 is formed by arranging the fiber bundles 16, each of which is a bundle of a plurality of fibers, in a row in the widthwise direction of the band-shaped bundle 12 (the direction of arrow C in FIGS. 3 and 4).

The fiber bundle 16 is formed by bundling a large number of fibers. The fibers forming the fiber bundle 16 are, for example, carbon fibers or glass fibers. The fiber bundle 16 is previously impregnated with a resin. The resin with which the fiber bundle 16 is impregnated, for example, is epoxy resin which is a thermosetting resin. Accordingly, the fiber bundle 16 is so-called tow prepreg.

Figure 2:
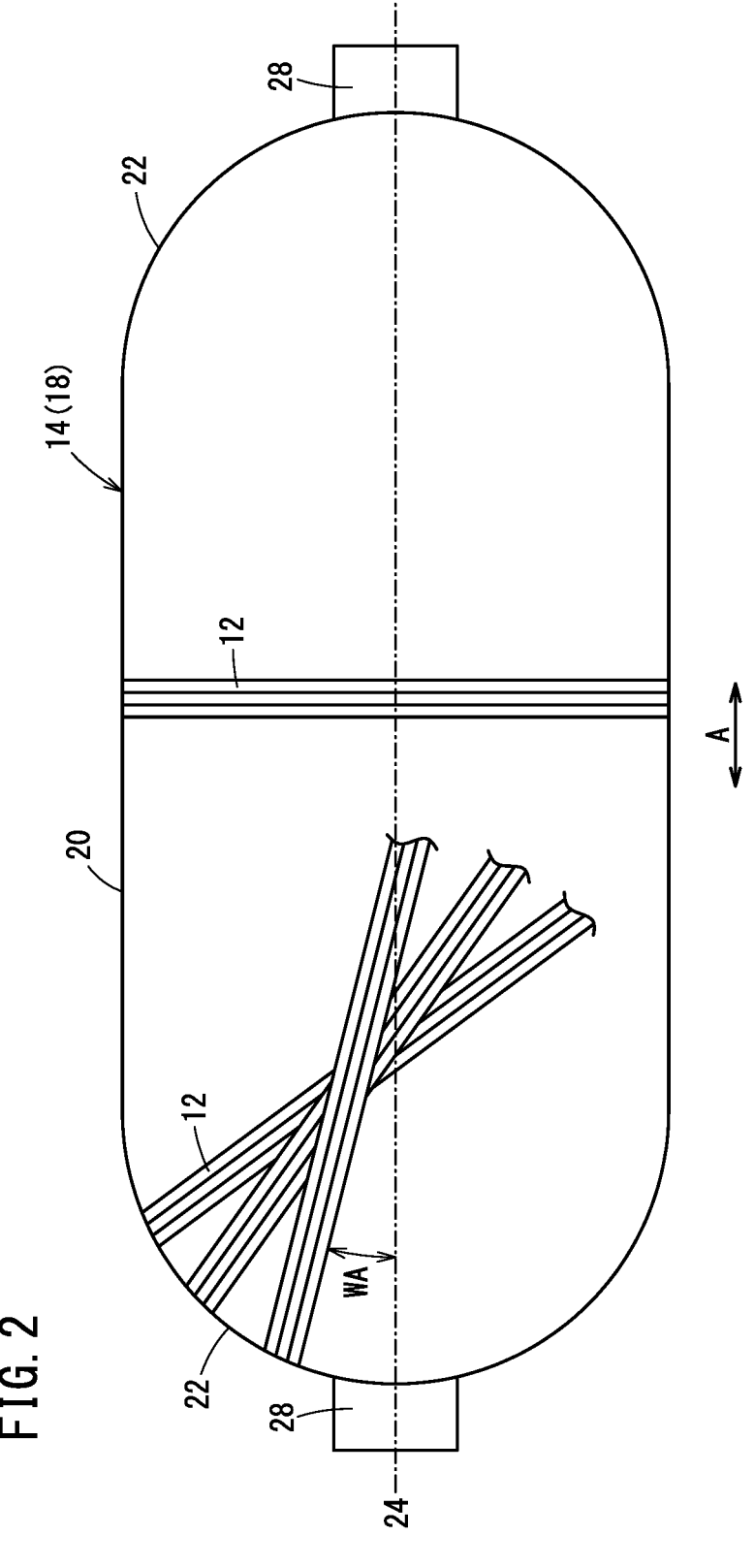
FIG. 2 is a front view of the workpiece.

As shown in FIG. 2, the workpiece 14 is a liner 18 made of resin or metal. By winding the band-shaped bundle 12 on the surface of the liner 18, a fiber reinforced resin layer (now shown) is formed on the surface of the liner 18.

Specifically, the liner 18 has a round tubular shaped cylinder portion 20 and dome portions 22 provided at both ends of the cylinder portion 20. A tubular cap 28 is attached to each of the two dome portions 22 coaxially with an axis 24 (central axis) of the liner 18. The direction of the axis 24 of the liner 18 is the direction of arrow A.

The FW device 10 forms a helical layer on the surface of the workpiece 14 by winding the band-shaped bundle 12 on the surfaces of the two dome portions 22 by way of helical winding, so as to be provided over the surface of the cylinder portion 20. Further, the FW device 10 forms a hoop layer on a surface of the portion of the helical layer that is formed on the cylinder portion 20, by winding the band-shaped bundle 12 by way of hoop winding. By winding the band-shaped bundle 12 on the surface of the workpiece 14 in this manner, a fiber reinforced resin layer is formed on the surface of the workpiece 14.

As shown in FIG. 1, the FW device 10 includes a fiber bundle delivery unit 30, a delivery head 32, and a liner support unit 34. In the FW device 10, the fiber bundle delivery unit 30 and the delivery head 32 are arranged in this order along the direction of arrow B toward the workpiece 14. The direction of arrow B is also a conveyance direction of the plurality of fiber bundles 16 and the band-shaped bundle 12.

The fiber bundle delivery unit 30 feeds out the plurality of fiber bundles 16 and delivers them to the delivery head 32. Specifically, the fiber bundle delivery unit 30 has a plurality of bobbins 36, a plurality of bobbin drive units (not shown), and a plurality of guide rollers 38. Each of the plurality of bobbins 36 has the same configuration. Each of the plurality of bobbin drive units has the same configuration. Each of the plurality of guide rollers 38 has the same configuration.

A fiber bundle 16, which is a roving, is wound around each of the plurality of bobbins 36 in advance. A bobbin drive unit is connected to each of the plurality of bobbins 36. Each of the plurality of bobbin drive units is a motor or the like. Each of the plurality of bobbin drive units drives the bobbin 36 to rotate, thereby feeding out the fiber bundle 16 from the bobbin 36.

Each of the plurality of guide rollers 38 is provided to be rotatable. Each of the plurality of guide rollers 38 conveys the fiber bundle 16 fed from each of the bobbins 36 to the delivery head 32 while changing the direction. Accordingly, the fiber bundle delivery unit 30 and the delivery head 32 are formed with a plurality of conveyance paths 40 for conveying the plurality of fiber bundles 16 fed from the plurality of bobbins 36.

In FIG. 1, as an example, six bobbins 36, six bobbin drive units, and two guide rollers 38 are provided in the fiber bundle delivery unit 30. Each of the two guide rollers 38 conveys the three fiber bundles 16 fed from the three bobbins 36 to the delivery head 32. Therefore, the plurality of conveyance paths 40 have a first conveyance path 42 and a second conveyance path 44. The plurality of fiber bundles 16 are supplied to the delivery head 32 via the first conveyance path 42 and the second conveyance path 44, respectively.

In the following description, the fiber bundle 16 conveyed through the first conveyance path 42 is referred to as a first fiber bundle 46. The fiber bundle 16 conveyed through the second conveyance path 44 is referred to as a second fiber bundle 48. The fiber bundle 16 wound around each bobbin 36 and the fiber bundle 16 after being fed out from each bobbin 36 are referred to as fiber bundles 16 as long as they are bundles of a plurality of fibers.

The delivery head 32 forms the band-shaped bundle 12, which is a single fiber bundle (band), by collecting the plurality of first fiber bundles 46 supplied through the first conveyance path 42 and the plurality of second fiber bundles 48 supplied through the second conveyance path 44. The delivery head 32 supplies the formed single band-shaped bundle 12 to the liner 18.

The delivery head 32 has a plurality of roller rows 50. The plurality of roller rows 50 include a plurality of alignment rollers 52, two assembly rollers 54 and 55, and a plurality of tip rollers 56 (rollers). The plurality of alignment rollers 52 are disposed upstream in the direction of arrow B in the delivery head 32. The two assembly rollers 54 and 55 are disposed downstream of the plurality of alignment rollers 52 in the direction of arrow B in the delivery head 32. The plurality of tip rollers 56 are disposed between the two assembly rollers 54 and 55 and the workpiece 14.

The plurality of alignment rollers 52 include a plurality of first alignment rollers 58 and a plurality of second alignment rollers 60. The plurality of first alignment rollers 58 are disposed in the first conveyance path 42. The plurality of second alignment rollers 60 are disposed in the second conveyance path 44.

The plurality of first alignment rollers 58 are sequentially disposed in the first conveyance path 42. The plurality of first fiber bundles 46 are provided over the plurality of first alignment rollers 58. The plurality of second alignment rollers 60 are sequentially disposed in the second conveyance path 44. The plurality of second fiber bundles 48 are provided over the plurality of second alignment rollers 60.

The first conveyance path 42 and the second conveyance path 44 are joined by the two assembly rollers 54 and 55. The two assembly rollers 54 and 55 rotate while contacting the plurality of first fiber bundles 46 conveyed through the first conveyance path 42 and the second fiber bundles 48 conveyed through the second conveyance path 44, thereby forming the fiber bundles 16 as the band-shaped bundle 12. The two assembly rollers 54 and 55 feed the formed band-shaped bundle 12 in the direction of arrow B.

The tip roller 56 advances the band-shaped bundle 12 conveyed from the two assembly rollers 54 and 55 toward the liner 18 supported by the liner support unit 34.

The liner support unit 34 supports the liner 18 which is the workpiece 14. The liner support unit 34 has a base 70, a first support post 72, a second support post 74, a first support shaft portion 76, and a second support shaft portion 78. The base 70 has a plate shape. The first support post 72 and the second support post 74 are attached to and extend away from the base 70 with a space therebetween in the direction of arrow A. The first support shaft portion 76 extends from the first support post 72 toward the second support post 74. The first support shaft portion 76 is inserted into one of the caps 28 (see FIG. 2) of the liner 18. The second support shaft portion 78 extends from the second support post 74 toward the first support post 72, coaxially with the first support shaft portion 76. The second support shaft portion 78 is inserted into another cap 28 of the liner 18. Accordingly, the first support shaft portion 76 and the second support shaft portion 78 are disposed coaxially with the axis 24 of the liner 18.

A rotation drive unit 80 such as a motor is connected to the first support shaft portion 76. The rotation drive unit 80 rotates the first support shaft portion 76 in order to rotate the workpiece 14 about the axis 24 of the liner 18. The band-shaped bundle 12 can be wound on the surface of the liner 18 by advancing the band-shaped bundle 12 through the tip roller 56 while rotating the workpiece 14 and moving the delivery head 32 in the direction of arrow A and to the upstream side and downstream side in the direction of arrow B.

The delivery head 32 is provided with a roller changer 90, which is also referred to as a roller change mechanism 90. The roller change mechanism 90 selects one of the plurality of tip rollers 56 and brings the selected tip roller 56 into contact with the band-shaped bundle 12. Specifically, the roller change mechanism 90 includes a drive source 92 such as a motor and a plurality of arms 96 connected to a shaft portion 94 of the drive source 92. The tip rollers 56 are connected to the tip ends of the plurality of arms 96 one by one. The drive source 92 rotates any one of the arms 96 about the shaft portion 94 to bring the tip roller 56 connected to the arm 96 into contact with the band-shaped bundle 12. The remaining tip rollers 56 that are not selected are retracted from the band-shaped bundle 12.

In FIG. 1, three tip rollers 56 and three arms 96 are disposed within the delivery head 32. In the following description, the three tip rollers 56 may be referred to as a first tip roller 100, a second tip roller 102, and a third tip roller 104.

As shown in FIG. 1, the first tip roller 100, the second tip roller 102, and the third tip roller 104 contact the band-shaped bundle 12 at different positions. Specifically, the first tip roller 100 is capable of contacting a portion of the band-shaped bundle 12 on the upstream side in the direction of arrow B between the two assembly rollers 54 and 55 and the workpiece 14. Specifically, the second tip roller 102 is capable of contacting a portion of the band-shaped bundle 12 on the downstream side in the direction of arrow B, compared with the location where the first tip roller 100 contacts the band-shaped bundle 12. The third tip roller 104 is capable of contacting a portion of the band-shaped bundle 12 on the downstream side in the direction of arrow B, compared with the location where the second tip roller 102 contacts the band-shaped bundle 12. FIG. 1 illustrates a case where the first tip roller 100 is in contact with the band-shaped bundle 12.

Figure 3:
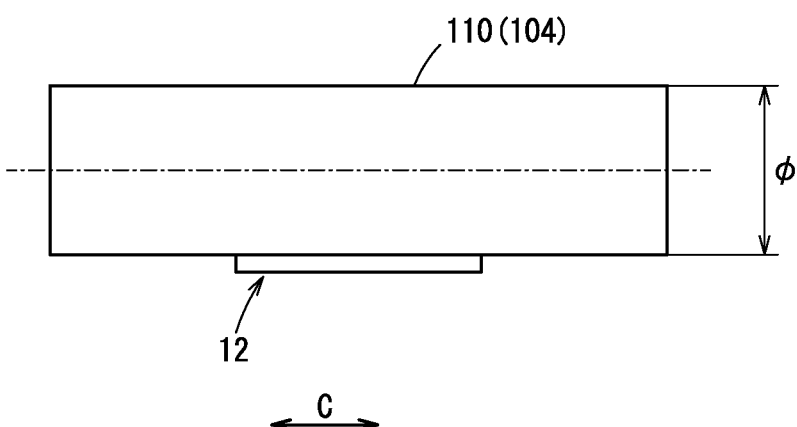
FIG. 3 is a front view of the straight roller.
Figure 4:
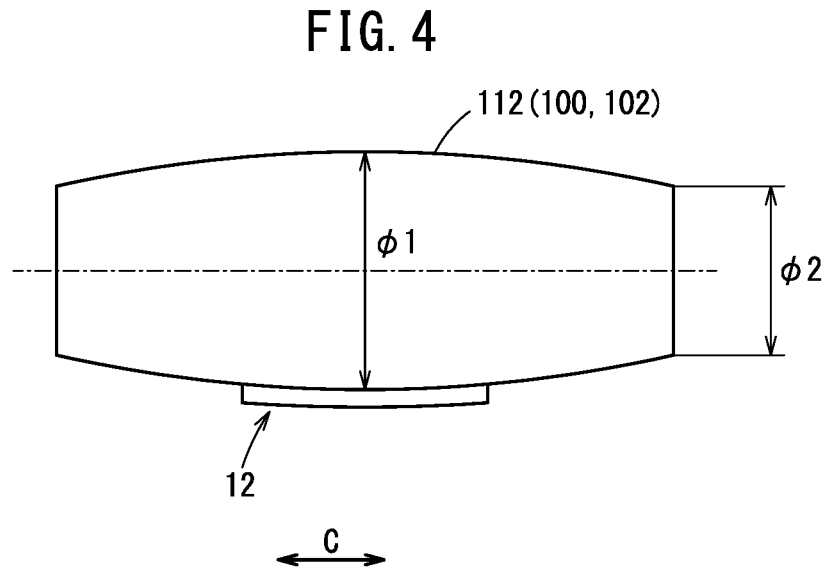
FIG. 4 is a front view of the crown roller.

The plurality of tip rollers 56 include a straight roller 110 (see FIG. 3) and a crown roller 112 (see FIG. 4).

As shown in FIG. 3, the straight roller 110 is a cylindrical roller having an outer diameter of Φ and extending in the direction of arrow C which is the axial direction of the tip roller 56. In FIG. 1, the third tip roller 104 is the straight roller 110.

As shown in FIG. 4, the crown roller 112 is a cylindrical roller that extends in the direction of arrow C and has an outer diameter that decreases from the center in the direction of arrow C toward both ends. The outer diameter of the crown roller 112 at the center is Φ1. The outer diameter of the crown roller 112 at both ends is Φ2 (Φ1>Φ2). In FIG. 1, the first tip roller 100 and the second tip roller 102 are the crown rollers 112.

When the band-shaped bundle 12 is wound around the workpiece 14 by way of hoop winding, the roller change mechanism 90 selects the third tip roller 104 which is the straight roller 110 and brings the selected third tip roller 104 into contact with the band-shaped bundle 12. When the band-shaped bundle 12 is wound around the workpiece 14 by way of helical winding, the roller change mechanism 90 selects the first tip roller 100 or the second tip roller 102, which is the crown roller 112, and brings the selected tip roller 56 into contact with the band-shaped bundle 12.

As shown in FIG. 2, the curvature of the surface (surface curvature) of the dome portion 22 varies along the radial direction of the dome portion 22 orthogonal to the axis 24 of the liner 18. Specifically, the curvature of the surface of the dome portion 22 becomes smaller as it approaches the axis 24. The curvature of the surface of the dome portion 22 increases as it is separated from the axis 24 and approaches the cylinder portion 20.

The curvature of the crown roller 112 is set in accordance with an angle WA of the winding of the band-shaped bundle 12 around the liner 18 with respect to the axis 24 of the liner 18. The winding angle WA is an angle formed between the band-shaped bundle 12 wound around the liner 18 and the axis 24 of the liner 18. The winding angle WA becomes smaller as it approaches the axis 24. The winding angle WA increases as the band-shaped bundle 12 separates away from the axis 24 and it approaches the cylinder portion 20. As described above, the curvature of the surface of the dome portion 22 varies along the radial direction of the dome portion 22. Therefore, the winding angle WA of the band-shaped bundle 12 around the dome portion 22 is a winding angle corresponding to the curvature of the surface of the dome portion 22.

The first tip roller 100 and the second tip roller 102 are the crown rollers 112 having different curvatures from each other. Specifically, the curvature of the surface of the first tip roller 100 is smaller than the curvature of the surface of the second tip roller 102.

When the helical winding is performed on a part of the dome portion 22 close to the axis 24 having a relatively small surface curvature, the band-shaped bundle 12 is wound at a small winding angle WA. In this case, the roller change mechanism 90 selects the first tip roller 100 having a small surface curvature and brings the selected first tip roller 100 into contact with the band-shaped bundle 12.

When the helical winding is performed on a part of the dome portion 22 having a relatively large surface curvature, the band-shaped bundle 12 is wound at a large winding angle WA. In this case, the roller change mechanism 90 selects the second tip roller 102 having a large surface curvature and brings the selected second tip roller 102 into contact with the band-shaped bundle 12.

When a control unit 130, which will be described later, determines to wind the band-shaped bundle 12 around the liner 18 according to a schedule included in a predetermined program, the control unit 130 can select any winding angle WA as a threshold value. Thus, when the winding angle WA is equal to or greater than the threshold value, the roller change mechanism 90 selects the second tip roller 102 having a large surface curvature, and can bring the selected second tip roller 102 into contact with the band-shaped bundle 12. When the winding angle WA is less than the threshold value, the roller change mechanism 90 selects the first tip roller 100 having a small surface curvature and can bring the selected first tip roller 100 into contact with the band-shaped bundle 12. In this manner, the first tip roller 100 or the second tip roller 102 can be selected in advance based on the threshold value. Alternatively, the winding angle WA may be detected using a camera or sensor (not shown), and the first tip roller 100 or the second tip roller 102 may be selected based on the detected winding angle WA.

When the band-shaped bundle 12 is wound around the cylinder portion 20 by way of hoop winding, the roller change mechanism 90 selects the third tip roller 104 and brings the selected third tip roller 104 into contact with the band-shaped bundle 12.

The FW device 10 further includes a computer 129. The computer 129 has the control unit 130 that is a processor. The control unit 130 may be configured by a processor such as a central processing unit (CPU) or a graphics processing unit (GPU). That is, the control unit 130 may be configured by a processing circuitry.

The control unit 130 has a memory 132. The control unit 130 realizes various functions for controlling the respective units of the FW device 10 by reading out and executing the program stored in the memory 132.

Moreover, it should be noted that at least a portion of the control unit 130 may be implemented by an integrated circuit such as an application specific integrated circuit (ASIC) or a field-programmable gate array (FPGA). At least part of the functions of the control unit 130 may be implemented by an electronic circuit including a discrete device.

The memory 132 may be configured by a volatile memory (not shown) and a non-volatile memory (not shown). As the volatile memory, there may be cited, for example, a random access memory (RAM). The volatile memory is used as a working memory of the processor, and temporarily stores data or the like necessary for processing or calculations. As the non-volatile memory, there may be cited, for example, a read only memory (ROM), a flash memory, or the like. The non-volatile memory is used as a storage memory, and stores therein programs, tables, maps, and the like. At least a portion of the memory 132 may be provided in the processor, the integrated circuit, or the like, which were described above.

The control unit 130 controls the rotation drive unit 80 in order to rotate the workpiece 14. The control unit 130 controls the plurality of bobbin drive units in order to rotate the plurality of bobbins 36. The control unit 130 controls the roller change mechanism 90 to bring the tip roller 56 of any of the first tip roller 100 to the third tip roller 104 into contact with the band-shaped bundle 12.

The control unit 130 controls the rotation drive unit 80 according to a schedule included in a predetermined program in order to wind the band-shaped bundle 12 around the workpiece 14 while rotating the workpiece 14. Therefore, the control unit 130 can grasp in advance at which timing the hoop winding and the helical winding are performed.

More specifically, the band-shaped bundle 12 is wound around the workpiece 14, whereby a fiber reinforced resin layer in which the band-shaped bundle 12 is layered is formed on the surface of the workpiece 14. Therefore, when the control unit 130 controls each unit according to the schedule included in the predetermined program, the control unit 130 controls the roller change mechanism 90 so as to select the third tip roller 104 when hoop winding is performed on the surface of the workpiece 14. When the control unit 130 controls each unit according to the schedule included in the predetermined program, the control unit 130 controls the roller change mechanism 90 so as to select the first tip roller 100 or the second tip roller 102 when helical winding is performed on the workpiece 14.

FIG. 5 is a flowchart showing the operation (filament winding method) of the FW device 10.

When the band-shaped bundle 12 is wound around the workpiece 14, as shown in FIG. 1, the liner 18 is supported by the liner support unit 34, and the fiber bundle delivery unit 30 and the delivery head 32 are disposed on the upstream side in the direction of arrow B with respect to the workpiece 14. Next, the plurality of fiber bundles 16 are drawn out from the plurality of bobbins 36, and the plurality of drawn-out fiber bundles 16 are passed over the plurality of alignment rollers 52 and the two assembly rollers 54 and 55. In this case, the plurality of fiber bundles 16 are arranged in a row in the direction of arrow A on the two assembly rollers 54 and 55, whereby forming one band-shaped bundle 12 is formed. Next, the starting end of one band-shaped bundle 12 is fixed to the surface of the workpiece 14.

Thereafter, in step S1 (first step) of FIG. 5, the control unit 130 determines whether or not hoop winding is to be performed on the workpiece 14 (whether or not a hoop layer is to be formed on the surface of the workpiece 14).

When forming the hoop layer on the surface of the workpiece 14 (step S1: YES), the control unit 130 proceeds to step S2 (first step). In step S2, the control unit 130 determines that the straight roller 110 is to be used. Next, the control unit 130 instructs the roller change mechanism 90 to select the straight roller 110. The drive source 92 of the roller change mechanism 90 selects the third tip roller 104, which is the straight roller 110, according to the instruction from the control unit 130. Next, the drive source 92 rotates the arm 96 to bring the third tip roller 104 into contact with the band-shaped bundle 12.

If the helical layer is formed on the surface of the workpiece 14 in step S1 (step S1: NO), the control unit 130 proceeds to step S3 (first step). In step S3, the control unit 130 determines that the crown roller 112 is to be used. Next, the control unit 130 determines whether or not helical winding is to be performed on a part of the surface of the dome portion 22 having a small surface curvature. That is, the control unit 130 determines whether or not a helical layer having a relatively small surface curvature (a low helical layer having a small winding angle WA) is formed on a portion of the surface of the dome portion 22 close to the axis 24.

When the low helical layer is formed on the surface of the workpiece 14 (step S3: YES), the control unit 130 proceeds to step S4 (first step). In step S4, the control unit 130 determines that the first tip roller 100, which is the tip roller 56 for the low helical layer, is to be used. Next, the control unit 130 instructs the roller change mechanism 90 to select the first tip roller 100. The drive source 92 of the roller change mechanism 90 selects the first tip roller 100 in accordance with the instruction from the control unit 130. Next, the drive source 92 rotates the arm 96 to bring the first tip roller 100 into contact with the band-shaped bundle 12.

If the low helical layer is not formed on the surface of the workpiece 14 in step S3 (step S3: NO), the control unit 130 proceeds to step S5 (first step). In step S5, the control unit 130 determines that a helical layer is to be formed on a part of the surface of the dome portion 22 that is positioned away from the axis 24. That is, the control unit 130 determines to form a helical layer (a medium helical layer or a high helical layer having a large winding angle WA) having a relatively medium or large surface curvature of the surface of the dome portion 22. Based on the determination result, the control unit 130 determines to use the second tip roller 102 which is the tip roller 56 for the medium and high helical layers. Next, the control unit 130 instructs the roller change mechanism 90 to select the second tip roller 102. The drive source 92 of the roller change mechanism 90 selects the second tip roller 102 in accordance with the instruction from the control unit 130. Next, the drive source 92 rotates the arm 96 to bring the second tip roller 102 into contact with the band-shaped bundle 12.

If another tip roller 56 has already contacted the band-shaped bundle 12 in steps S2, S4, and S5, the drive source 92 retracts the other tip roller 56 from the band-shaped bundle 12 and brings the selected tip roller 56 into contact with the band-shaped bundle 12.

After the processing of step S2, step S4, or step S5, in step S6 (second step), the control unit 130 drives the rotation drive unit 80 to rotate the workpiece 14. The control unit 130 drives the plurality of bobbin drive units to rotate the bobbins 36, thereby conveying the plurality of fiber bundles 16 to the delivery head 32. In this way, the winding of the band-shaped bundle 12 on the surface of the workpiece 14 is started.

In this case, when the band-shaped bundle 12 is wound around the workpiece 14 by hoop winding, the third tip roller 104, which is the straight roller 110, feeds the band-shaped bundle 12 to the workpiece 14. When the band-shaped bundle 12 is wound around the workpiece 14 by way of helical winding, the first tip roller 100 or the second tip roller 102 serving as the crown roller 112 feeds the band-shaped bundle 12 to the workpiece 14.

In step S7, the control unit 130 determines whether or not to finish the winding of the band-shaped bundle 12 around the workpiece 14.

When the winding of the band-shaped bundle 12 around the workpiece 14 is continued (step S7: NO), the control unit 130 returns to step S1 and executes the processing of steps S1 to S6 again. By repeatedly executing the processing of steps S1 to S6, the band-shaped bundle 12 is wound around the workpiece 14, and a fiber reinforced resin layer including a helical layer and a hoop layer is formed on the surface of the workpiece 14.

When the winding of the band-shaped bundle 12 around the workpiece 14 is finished (YES in step S7), the control unit 130 stops the driving of the rotation drive unit 80 and the plurality of bobbin drive units. By taking out the workpiece 14 from the liner support unit 34, a desired product can be obtained.

In the above description, the FW device 10 is provided with one straight roller 110 and two crown rollers 112. In the present embodiment, the number of the crown rollers 112 may be changed according to the shape of the dome portion 22 and the number of the fiber bundles 16 to be used (the width of the band-shaped bundle 12).

In the present embodiment, the curvature of the surface of the dome portion 22 may be reduced as the dome portion 22 is separated from the axis 24 of the liner 18 in the radial direction. In this case, when the helical winding is performed on the portion of the dome portion 22 close to the axis 24 having a relatively large curvature of the surface, the roller change mechanism 90 may select the second tip roller 102 and bring the selected second tip roller 102 into contact with the band-shaped bundle 12. When helical winding is performed on a part of the dome portion 22 close to the cylinder portion 20 having a relatively small surface curvature, the first tip roller 100 may be selected and brought into contact with the band-shaped bundle 12.

In the following description, an intermediate position of each of the dome portions 22 in the radial direction thereof is referred to as a radial intermediate position on the surface of the dome portion 22. In this case, the curvature of the surface of each of the dome portions 22 may be increased as a distance from the radial intermediate position on the surface of each of the dome portions 22 toward the axis 24 or the cylinder portion 20 decreases. Otherwise, the curvature of the surface of each of the dome portions 22 may be decreased as a distance from the radial intermediate position on the surface of each of the dome portions 22 toward the axis 24 or the cylinder portion 20 decreases. In this case, the roller change mechanism 90 may select any one of the plurality of crown rollers 112 depending on the winding angle WA of the band-shaped bundle 12 with respect to the liner 18.

With respect to the above disclosure, the following appendices are disclosed.

Appendix 1

The filament winding device (10) is configured to supply the band-shaped bundle (12), which is the bundle of the plurality of fibers, to the workpiece (14), and wind the band-shaped bundle around the workpiece, the workpiece including the cylinder portion (20) having a round tubular shape and the dome portions (22) provided at both ends of the cylinder portion. The filament winding device includes the plurality of rollers (56) configured to rotate while being in contact with the band-shaped bundle to thereby feed the band-shaped bundle toward the workpiece, and the roller change mechanism (90) configured to select one of the plurality of rollers and bring the selected roller into contact with the band-shaped bundle, wherein the plurality of rollers include the straight roller (110) and the crown roller (112), and the roller change mechanism is configured to, when the band-shaped bundle is wound around the workpiece by way of hoop winding, select the straight roller and bring the selected straight roller into contact with the band-shaped bundle, and when the band-shaped bundle is wound around the workpiece by way of helical winding, select the crown roller and bring the selected crown roller into contact with the band-shaped bundle.

According to the present invention, the straight roller is selected for hoop winding, and the crown roller is selected for helical winding. This makes it possible to absorb the difference in path length between the center and both ends of the band-shaped bundle in the widthwise direction when the band-shaped bundle is wound around the workpiece, and to appropriately apply tension to each fiber bundle of the band-shaped bundle. As a result, the mechanical strength of the product, which is a workpiece wound with the band-shaped bundle, can be improved.

Appendix 2

In the filament winding device according to Appendix 1, a curvature of the crown roller may be set depending on a winding angle (WA) of the band-shaped bundle on the workpiece with respect to a central axis (24) of the workpiece.

Since the curvature of the crown roller is set depending on the winding angle of the band-shaped bundle with respect to the workpiece, when the band-shaped bundle is wound around the workpiece by way of helical winding, tension can be appropriately applied to each fiber bundle of the band-shaped bundle.

Appendix 3

In the filament winding device according to Appendix 2, the curvature of the surface of each of the two dome portions may change along the radial direction of the dome portions orthogonal to the central axis, the crown roller may include the plurality of crown rollers having different curvatures from each other, and the roller change mechanism may select one of the plurality of crown rollers depending on the winding angle of the band-shaped bundle on the workpiece, and bring the selected crown roller into contact with the band-shaped bundle.

Since the surface curvature of the dome portion corresponds to the winding angle, when the band-shaped bundle is wound around the workpiece by way of helical winding, the tension can be more appropriately applied to each fiber bundle of the band-shaped bundle by switching the crown roller depending on the winding angle.

Appendix 4

In the filament winding device according to Appendix 3, the plurality of crown rollers may be the first crown roller and the second crown roller having a curvature larger than that of the first crown roller, the curvature of the surface of each of the two dome portions may increase as the distance from the central axis in the radial direction increases, and the roller change mechanism may be configured to, when the helical winding is performed on the part of each of the two dome portions close to the central axis having a relatively small curvature of the surface, select the first crown roller and bring the selected first crown roller into contact with the band-shaped bundle, and when the helical winding is performed on the part of each of the two dome portions close to the cylinder portion having a relatively large curvature of the surface, select the second crown roller and bring the selected second crown roller into contact with the band-shaped bundle.

When the band-shaped bundle is wound around the dome portion by way of helical winding, tension can be more appropriately applied to each fiber bundle of the band-shaped bundle by switching to an appropriate crown roller depending on the winding angle.

Appendix 5

In the filament winding device according to Appendix 3, the plurality of crown rollers may be the first crown roller and the second crown roller having a curvature larger than that of the first crown roller, the curvature of the surface of each of the two dome portions may decrease as the distance from the central axis in the radial direction increases, and the roller change mechanism may be configured to, when the helical winding is performed on the part of each of the two dome portions close to the central axis having a relatively large curvature of the surface, select the second crown roller and bring the selected second crown roller into contact with the band-shaped bundle, and when the helical winding is performed on the part of each of the two dome portions close to the cylinder portion having a relatively small curvature of the surface, select the first crown roller and bring the selected first crown roller into contact with the band-shaped bundle.

In this configuration, when the band-shaped bundle is wound around the dome portion by way of helical winding, the tension can be more appropriately applied to each fiber bundle of the band-shaped bundle by switching to an appropriate crown roller depending on the winding angle.

Appendix 6

In the filament winding device according to Appendix 3, the curvature of the surface of each of the two dome portions may increase or decrease as the distance from the radial intermediate position on the surface toward the central axis or the cylinder portion decreases, and the roller change mechanism may select one of the plurality of crown rollers depending on the winding angle of the band-shaped bundle on the workpiece.

In this configuration as well, when the band-shaped bundle is wound around the dome portion by way of helical winding, the tension can be more appropriately applied to each fiber bundle of the band-shaped bundle by switching to an appropriate crown roller depending on the winding angle.

Appendix 7

The filament winding method of supplying the band-shaped bundle, which is the bundle of the plurality of fibers, to the workpiece, and winding the band-shaped bundle around the workpiece is provided. The workpiece includes the cylinder portion having the round tubular shape and dome portions provided at both ends of the cylinder portion.

The method includes selecting the straight roller and bringing the selected straight roller into contact with the band-shaped bundle when the band-shaped bundle is wound around the workpiece by way of hoop winding, and selecting the crown roller and bringing the selected crown roller into contact with the band-shaped bundle when the band-shaped bundle is wound around the workpiece by way of helical winding, as the first step (S1 to S5), and rotating the straight roller or the crown roller in contact with the band-shaped bundle to feed the band-shaped bundle toward the workpiece and winding the band-shaped bundle around the workpiece, as the second step (S6).

According to the present invention, the straight roller is selected for hoop winding, and the crown roller is selected for helical winding. This makes it possible to absorb the difference in path length between the center and both ends of the band-shaped bundle in the widthwise direction when the band-shaped bundle is wound around the workpiece, and to appropriately apply tension to each fiber bundle of the band-shaped bundle. As a result, the mechanical strength of the product, which is a workpiece wound with the band-shaped bundle, can be improved.

It should be noted that the present invention is not limited to the disclosure described above, and various alternative or additional configurations could be adopted therein without departing from the essence and gist of the present invention.

The invention claimed is:

1. A filament winding device configured to supply a band-shaped bundle, which is a bundle of a plurality of fibers, to a workpiece, and wind the band-shaped bundle around the workpiece, the workpiece including a cylinder portion having a round tubular shape and dome portions provided at both ends of the cylinder portion, the filament winding device comprising:

a plurality of rollers configured to rotate while being in contact with the band-shaped bundle to thereby feed the band-shaped bundle toward the workpiece; and a roller changer configured to select one of the plurality of rollers and bring a selected roller into contact with the band-shaped bundle, wherein the plurality of rollers include a straight roller and at least one crown roller, and the roller changer is configured to:

when the band-shaped bundle is wound around the workpiece by way of hoop winding, select the straight roller and bring the selected straight roller into contact with the band-shaped bundle; and when the band-shaped bundle is wound around the workpiece by way of helical winding, select the crown roller and bring the selected crown roller into contact with the band-shaped bundle.

2. The filament winding device according to claim 1, wherein a curvature of a surface of each of the two dome portions changes along a radial direction of the dome portions orthogonal to the central axis, the plurality of rollers include the straight roller and a plurality of crown rollers having different curvatures from each other, and the roller changer selects one of the plurality of crown rollers depending on a winding angle of the band-shaped bundle on the workpiece with respect to a central axis of the workpiece, and brings the selected crown roller into contact with the band-shaped bundle.

3. The filament winding device according to claim 2, wherein the plurality of crown rollers are a first crown roller and a second crown roller having a curvature larger than that of the first crown roller,

13

14 the curvature of the surface of each of the two dome portions increases as a distance from the central axis in the radial direction increases, and the roller changer is configured to:

when the helical winding is performed on a part of each of the two dome portions close to the central axis having a relatively small curvature of the surface, select the first crown roller and bring the selected first crown roller into contact with the band-shaped bundle; and when the helical winding is performed on a part of each of the two dome portions close to the cylinder portion having a relatively large curvature of the surface, select the second crown roller and bring the selected second crown roller into contact with the band-shaped bundle.

4. The filament winding device according to claim 2, wherein the plurality of crown rollers are a first crown roller and a second crown roller having a curvature larger than that of the first crown roller, the curvature of the surface of each of the two dome portions decreases as a distance from the central axis in the radial direction increases, and the roller changer is configured to:

when the helical winding is performed on a part of each of the two dome portions close to the central axis having a relatively large curvature of the surface, select the second crown roller and bring the selected second crown roller into contact with the band-shaped bundle; and when the helical winding is performed on a part of each of the two dome portions close to the cylinder portion having a relatively small curvature of the surface, select the first crown roller and bring the selected first crown roller into contact with the band-shaped bundle.

5. The filament winding device according to claim 2, wherein the curvature of the surface of each of the two dome portions increases or decreases as a distance from a radial intermediate position on the surface toward the central axis or the cylinder portion decreases, and the roller changer selects one of the plurality of crown rollers depending on the winding angle of the band-shaped bundle on the workpiece.

* * * * *